United States Patent
Chiang et al.

(10) Patent No.: US 6,594,277 B1
(45) Date of Patent: Jul. 15, 2003

(54) DYNAMIC-RATE, DIFFERENTIAL CLASS-BASED QUALITY OF SERVICE AGENT FOR INTERNET PROTOCOL EXCHANGE SYSTEMS

(75) Inventors: Luo-Jen Chiang, Freehold, NJ (US); Anthony H. Chien, Holmdel, NJ (US); Taryn S. Moody, Atlantic Highlands, NJ (US); Anwar A. Siddiqui, New York, NY (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/358,413

(22) Filed: Jul. 22, 1999

(51) Int. Cl.$^7$ .................................................. H04J 3/16
(52) U.S. Cl. .................... 370/465; 370/230; 370/395.21
(58) Field of Search ................................ 370/465, 466, 370/468, 469, 477, 230, 231, 232, 235, 237, 352, 355, 356, 353, 357, 229, 252, 261, 262, 395.1, 396, 395.21, 395.42, 395.43, 395.5, 395.52, 395.53, 444, 455

(56) References Cited

U.S. PATENT DOCUMENTS

| 5,774,656 | A  | * | 6/1998 | Hattori et al. ............... 709/202 |
| 6,216,006 | B1 | * | 4/2001 | Scholefield et al. ......... 455/422 |
| 6,266,327 | B1 | * | 7/2001 | Hernandez-Valencia .... 370/230 |
| 6,360,271 | B1 | * | 3/2002 | Schuster et al. ............. 370/516 |
| 6,400,685 | B1 | * | 6/2002 | Park ............................. 370/232 |
| 6,404,735 | B1 | * | 6/2002 | Beshai et al. ................ 370/230 |
| 6,415,313 | B1 | * | 7/2002 | Yamada et al. .............. 709/200 |

* cited by examiner

*Primary Examiner*—David Vincent
*Assistant Examiner*—Brian Nguyen
(74) *Attorney, Agent, or Firm*—Birch, Stewart, Kolasch & Birch, LLP

(57) ABSTRACT

A unique method and apparatus for a dynamic rate, differential class-based quality of service agent for a communication network that provides a quality of service guarantee by taking into account the existing state of the network and user-defined classes of service is provided. A flexible quality of service agent, separate from the control plane which contains call processing and network management, is provided which optimizes network performance by minimizing the amount of information transmitted over the network to set-up a call and media negotiation, implements admission control to maintain the quality of the ongoing calls and administers the system wide quality of service by providing instantaneous feedback on the current state of the system/network at both the transmitting and receiving end.

71 Claims, 7 Drawing Sheets

DYNAMIC-RATE, DIFFERENTIAL CLASS-BASED QUALITY OF SERVICE AGENT FOR INTERNET PROTOCOL EXCHANGE SYSTEMS

BACKGROUND OF THE INVENTION

1. Field of the Invention

The present invention relates generally to communication networks and more particularly to a quality of service agent which optimizes network performance for multimedia communications.

2. Description of the Related Art

It has long been known to provide communication workstations, such as computers and telephones, interconnected by digital communication networks whereby users of the individual workstations may communicate, i.e., transfer information, with one another over the network. In a connection-oriented communication network, the transfer of information between two end-users is accomplished by network functions that select and allocate network resources along an acceptable path. The logical association between the communication end-users is referred to as a call. The chain of associated network resources that support the call is referred to as a connection. Connection management is a network function that is responsible for setting up, maintaining, and taking down connections. Each call request is issued with a set of quality of service (QoS) requirements that govern the resource allocation for the desired connection. Quality of service requirements may include providing access, performance, fault tolerance, and security between a specified set of end systems as directed by the network's manager.

More recently, users have increasingly requested desktop conferencing, remote presentations, and other multimedia applications between network users. Such multimedia applications have data-intensive sound, voice, and video flows associated therewith. This requires concomitant high bandwidth communication links between distributed computing systems with minimal communication delay, maximum throughput, and instantaneous burst communication capability. The requirements of such multimedia applications accordingly make scheduling appropriate resources to provide for the necessary quality of service very difficult.

To reduce design complexity, most networks are organized as a series of layers, each one built upon its predecessor as described in OSI, A Model for Computer Communications Standards, Black, Ulyess, Prentice Hall, 1991. The number of layers, the name of each layer, contents, and function of each layer differ from network to network. However, in each network, the purpose of the layers is to offer certain services to the higher layers, shielding those layers from the details of how the offered services are actually implemented.

FIG. 1 illustrates a schematic representation of a multi-layered communication network model based on the OSI layered reference model. The lowest layer is the physical layer OSI 1, 20, which is responsible for implementing a physical circuit between data terminal equipment and data circuit terminating equipment. The data link or second layer, OSI 2, 22, is responsible for transfer of data across the link. The third or network layer, OSI 3, 24, specifies the interface of the user into a network and also defines network switching/routing and communications between networks. The fourth or transport layer, OSI 4, 26, provides an interface between the data communications network and the upper three layers. The fifth or session layer, OSI 5, 28, serves as a user interface into the transport layer below, providing a means for exchange of data between users such as simultaneous transmission, alternate transmission, checkpoint procedures and the like. The sixth or presentation layer, OSI 6, 30, ensures that user applications can communicate with each other, and the seventh or application layer, OSI 7, 32, supports the end-user application process.

The fourth layer 26 or transport layer is of particular interest inasmuch as it provides the user options in obtaining certain levels of quality, and is designed to keep the user isolated from some of the physical and functional aspects of the network. To improve network performance, existing techniques rely on transport layer flow control to manage the network performance. However, there are problems with this approach. As multimedia applications become more prevalent, the use of the transport layer as the only mechanism of flow control can result in a reduced network throughput, since the transport layer must handle increased volume of different types of multimedia packets, each with different priorities. Thus, the transport layer mechanism of flow control affects the quality of service for both real time applications, such as voice packets, and non-real time applications, such as data packets, equally from the user's perspective.

Conventional allocation of network resources is by and large static. A fixed level of quality of service, specified by the user, is matched at connection setup for a call and must be maintained throughout the duration of the call. Static allocation of network resources is inefficient, and typically inadequate for a dynamic networking environment where the user requirements and the quality characteristics of network resources are not static.

Thus, there exists a need for a system and method that addresses the problem of managing network performance which optimizes both end-to-end application performance and network performance.

SUMMARY OF THE INVENTION

The present invention provides a unique method and apparatus for a dynamic rate, differential class-based quality of service agent that provides a quality of service guarantee by taking into account the existing state of the network and user-defined classes of service.

In accordance with the present invention, a flexible quality of service agent, separate from the control plane which contains call processing and network management, is provided which optimizes network performance by minimizing the amount of information transmitted over the network to set-up a call and media negotiation, implements admission control to maintain the quality of the ongoing calls and administers the system wide quality of service by providing instantaneous feedback on the current state of the system/network at both the transmitting and receiving end.

These and other advantages and features of the invention will become apparent from the following detailed description of the invention which is provided in connection with the accompanying drawings.

DETAILED DESCRIPTION

Figure 1:
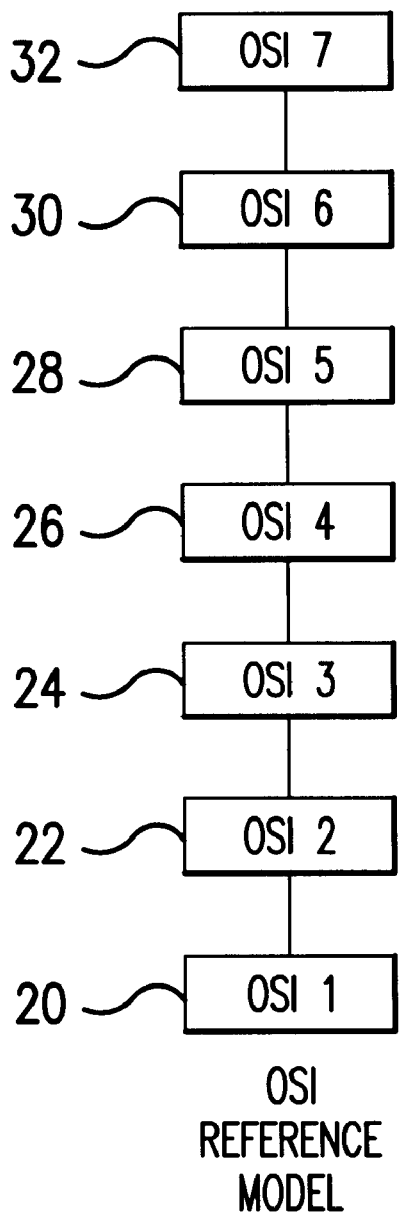
FIG. 1 illustrates a schematic representation of a multi-layered communication network based on the OSI layered reference model.

The present invention will be described as set forth in the embodiments illustrated in FIGS. 2–6. Other embodiments may be utilized and structural, logical or programming changes may be made without departing from the spirit or scope of the present invention. Like items are referred to by like reference numerals throughout the description.

In accordance with the present invention, a quality of service guarantee is provided by a quality of service agent that optimizes both end-to-end application and network performance by providing network feedback at the application layer that can be used before or after call set-up, and provides personalized quality of service using differential class of services.

Figure 2:
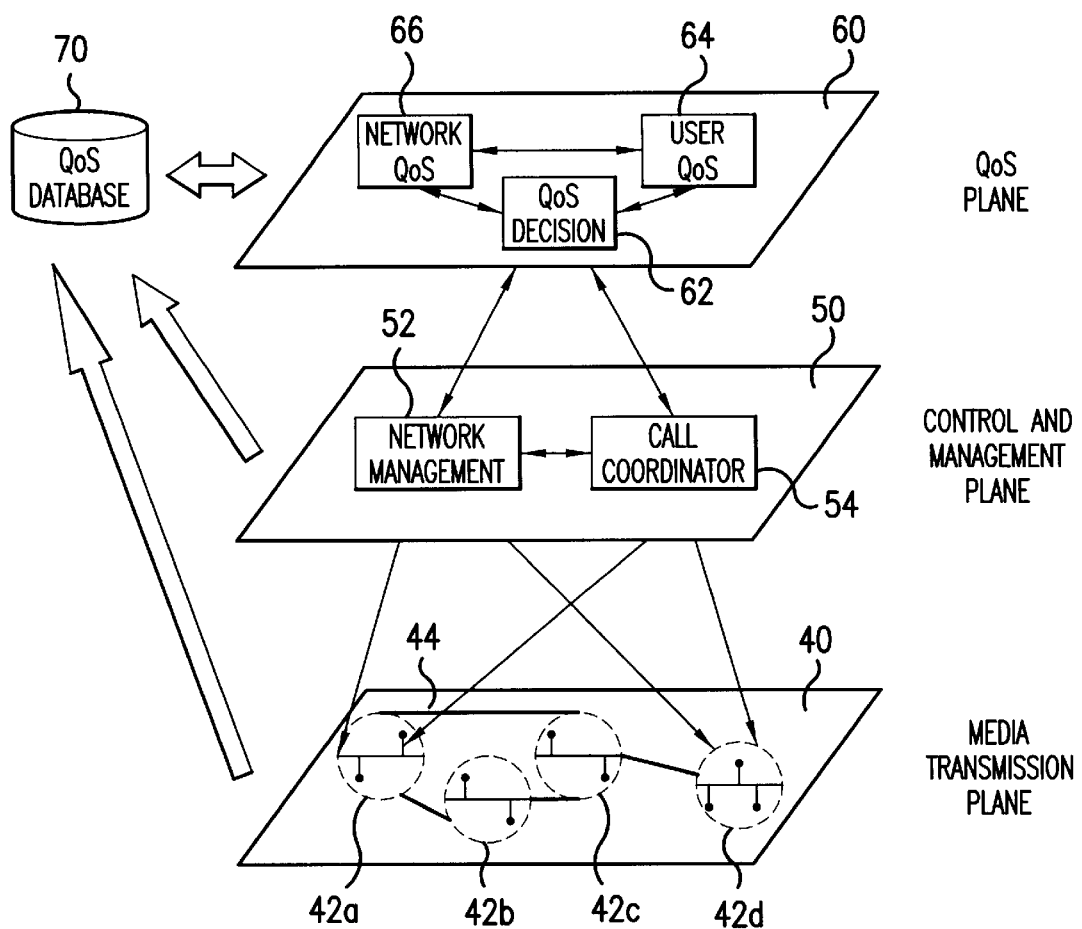
FIG. 2 illustrates a schematic representation of a three layered communication network having a quality of service agent in accordance with the present invention.

FIG. 2 illustrates a schematic representation of a three layered communication network having a quality of service agent in accordance with the present invention. The first two layers, i.e., the media transmission plane 40 and the control and management plane 50, are responsible for implementing a physical circuit between data terminal equipment, such as for example LAN segments 42a–42d, transferring data across a link, such as for example data path 44, specifying the interface of the user into a network, defining network switching/routing and communications between networks via a management control device, such as for example network management 52 and a control device, such as for example call coordinator 54, providing an interface to the user and ensuring that user applications can communicate with each other. In accordance with the present invention, a third layer, or quality of service (QoS) plane 60, is provided to support the end-user application process. QoS plane 60 is provided with a QoS agent including QoS Decision block 62, User QoS block 64 and Network QoS block 66 which supports the end-user application process. The QoS agent can be implemented as a distributed software object or as a firmware object within processors in call coordinator 54 and network management 52, based on the needs of the user's system, and is configurable using the system management. A QoS Database 70 is provided in accordance with the present invention to store user and device profiles. The QoS plane 60, as will be described further below, allows for optimization of user expectations of quality of service and network performance, and assist the Call Coordinator 54 of Control and Management Plane 50 to set appropriate signaling parameters based on system resources and the user and device profiles stored in QoS database 70.

Figure 3:
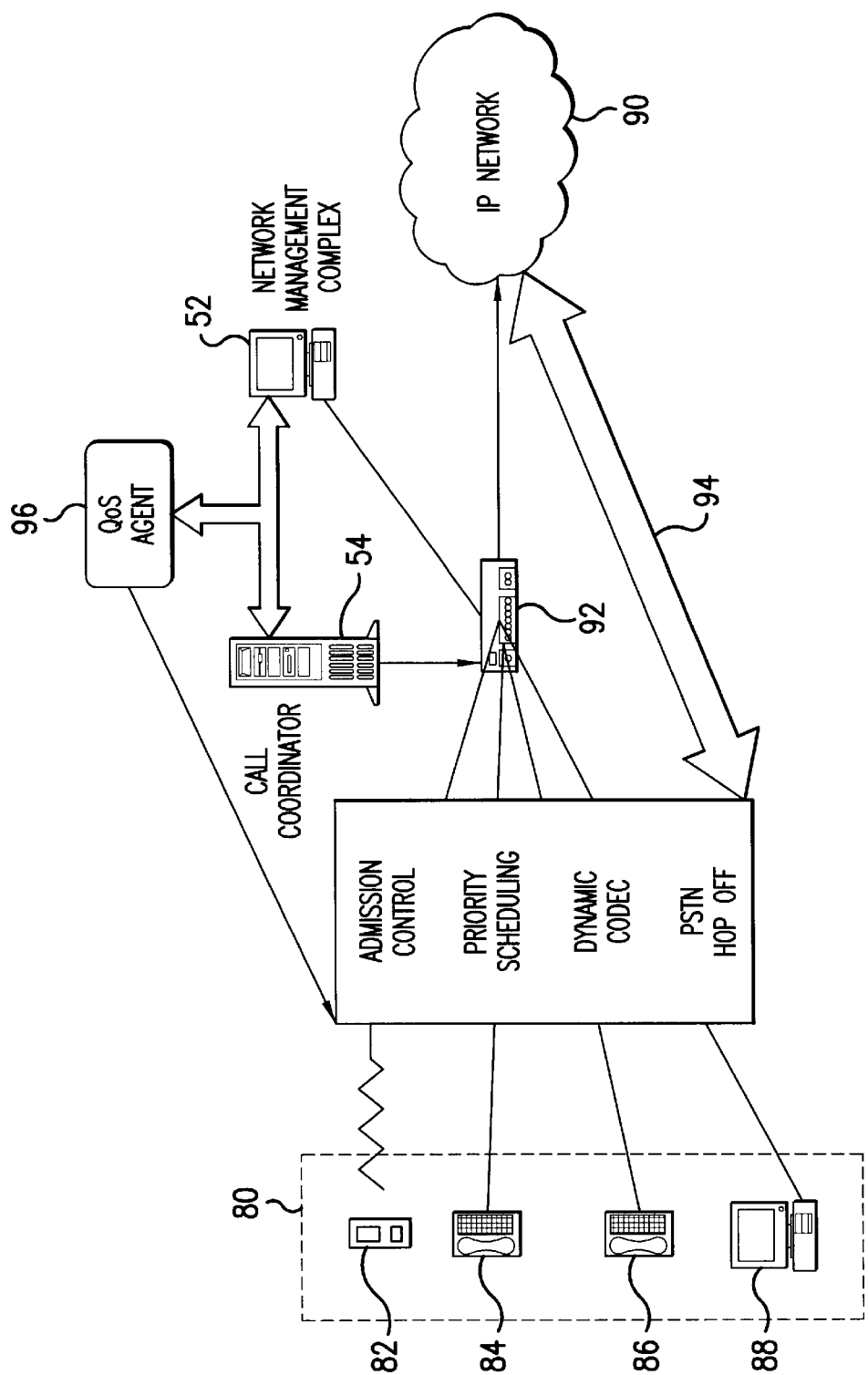
FIG. 3 illustrates in block diagram form end-to-end quality of service operations in accordance with the present invention.

FIG. 3 illustrates in block diagram form end-to-end quality of service operations in accordance with the present invention. A customer communication system includes communications workstations 80, such as for example wireless telephone/Personal Data Assistant 82, Plain Old Telephone System (POTS) phone 84, Internet Protocol (IP) phone 86, and personal computer (PC) 88, through which information is transferred via hub 92, which performs Admission Control, Priority Scheduling, Dynamic Coding/Decoding (Codec) and Public Switched Telephone Network (PSTN) Hop Off functions, to IP Network 90. The state of IP Network 90 is provided as feedback 94 back to the hub 92 for use in performing the functions described above. In accordance with the present invention, QoS Agent 96 is provided to support the end-user application process by assisting the Call Coordinator 54 and Network Management Complex 52 to establish and maintain a call. As previously noted, the QoS Agent 96 can be implemented as a distributed software object or as a firmware object based on the needs of the user's system, and is configurable using the system management.

When communication workstations 80 are established by the system management, a User Class of Service (UCOS) is established by the system administrator for each workstation. The UCOS includes, for example, high priority user, low priority user, voice only, video/voice user, etc. Thus for example, voice calls from phone 84 may have a higher priority than voice/video calls from PC 88. The QoS Agent 96 operates to translate the User Class of Services (UCOS) specified by the system management into Network Class of Services (NCOS). Each NCOS implies minimum network guarantees, such as for example the minimum bandwidth that will be provided for a call, that will be given to a user. For example, a Constant Agreement Service (CAS) NCOS implies that if at call setup time a certain bandwidth is acquired, it will be continued until the end of the call. Alternatively, a Variable Agreement Service (VAS) NCOS implies that the call may be switched to a lower bandwidth based on network conditions which may result in the loss of some data packets. When one of the communication workstations 80, such as for example phone 86, requests service, i.e., a call through IP Network 90, the Admission Control function will utilize the information provided by the network feedback 94 to determine the best level of service currently available within the IP Network 90 at that time. Once this has been determined, the QoS agent 96, utilizing the information obtained from the Admission Control, will assist the Call Coordinator 54 to establish the call by negotiating with the IP Network 90 to implement the best level of service currently available as further described below with respect to FIG. 4. During the call setup, the Call Coordinator 54 uses dynamic network statistics to control services such as negotiate media, change the rate of transmission of an ongoing call on the fly, provide jitter buffer information, recommend PSTN hop-off, etc.

Figure 4:
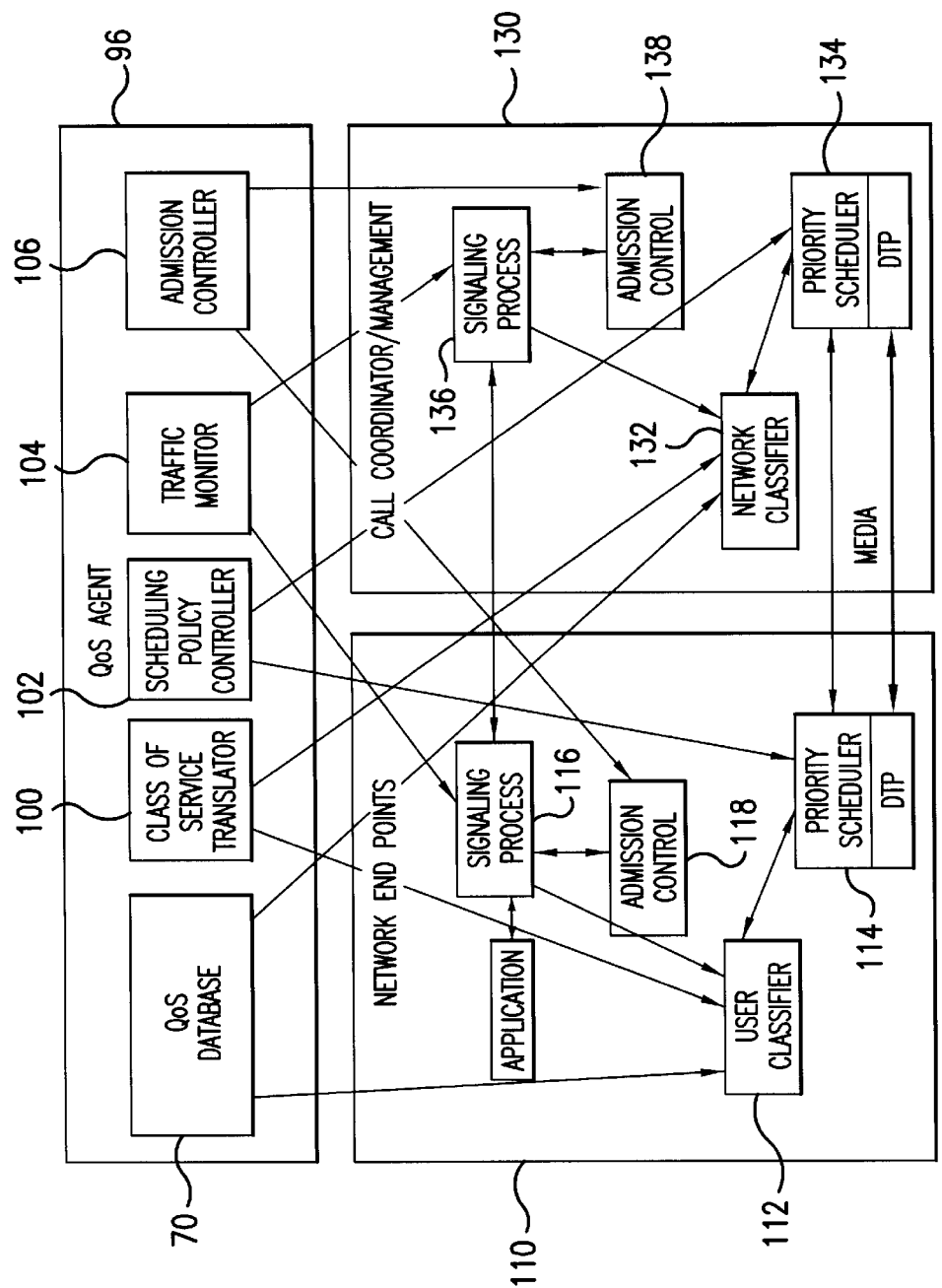
FIG. 4 illustrates a functional block diagram of implementation of service utilizing a quality of service agent in accordance with the present invention.

FIG. 4 illustrates a functional block diagram of implementation of service utilizing a quality of service agent in accordance with the present invention. The functional blocks include QoS agent 96, Network Endpoints 110 and Call Coordinator/Management block 130, which includes Call Coordinator 54 and Management Complex 52. QoS Agent 96 includes a Class of Service Translator function 100 to translate from User Class of Services specified by the User Classifier 112 to Network Class of Services determined by Network Classifier 132. QoS Agent 96 further includes a QoS database 70, a Scheduling Policy Controller function 102, a Traffic Monitor function 104, and an Admission Controller function 106. QoS database 70 is used to store information specified by User Classifier 112 and Network Classifier 132, such as for example system information about internal compatible endpoints that register with the system and user's calling habits. For example, internal compatible endpoints, such as for example workstations 80, can register with the QoS agent 96 when they are added to the system, such as a Local Area Network (LAN), or when they boot up. The system information that can be entered into the database 70 includes the Medium Access Control (MAC) address for an endpoint, a list of compressors/decompressors and mixer ports that service end endpoint, etc. Additionally, similar information about external endpoints (not shown) can also be stored when an external device users the system for the first time. Database 70 can also be used to store and track user's calling habits. Typically, a user will call the same group of people, i.e., project mates, friends, family, etc. For each user, the QoS agent 96 will utilize the user's calling pattern and also User Class of Service assigned to the user by the system administrator to reduce the time required to setup a call by QoS agent 96.

Scheduling Policy Controller 102 indicates to the Network Endpoints 110 how to mark the data packets so that Priority Schedulers 114, 134 can determine the priority of the packets through the system. Traffic Monitor 104 provides QoS Agent 96 with information about the network, such as for example increased delay of the system, as provided from Signaling Processes 116, 136. Admission Controller 106 utilizes information provided by the Admission Controls 118, 138 to determine the best level of service currently available within the network as previously described with respect to FIG. 3.

Figure 5A:
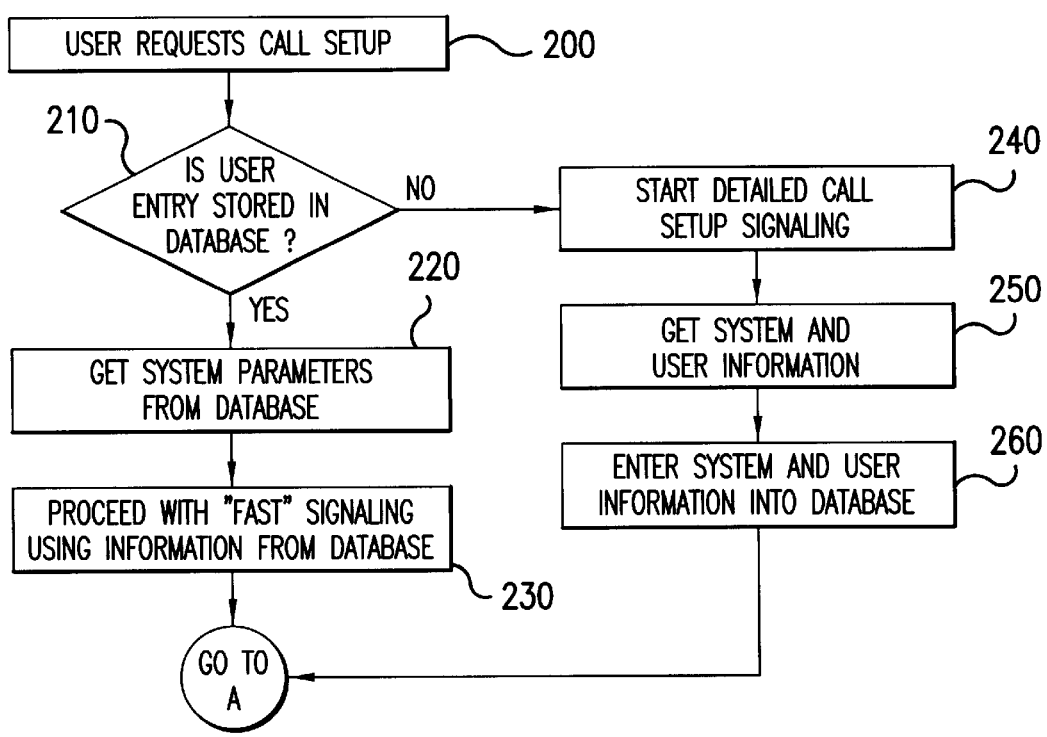
FIGS. 5A and 5B illustrate in flow chart form a method for setting up a call utilizing a quality of service agent in accordance with the present invention.
Figure 5B:
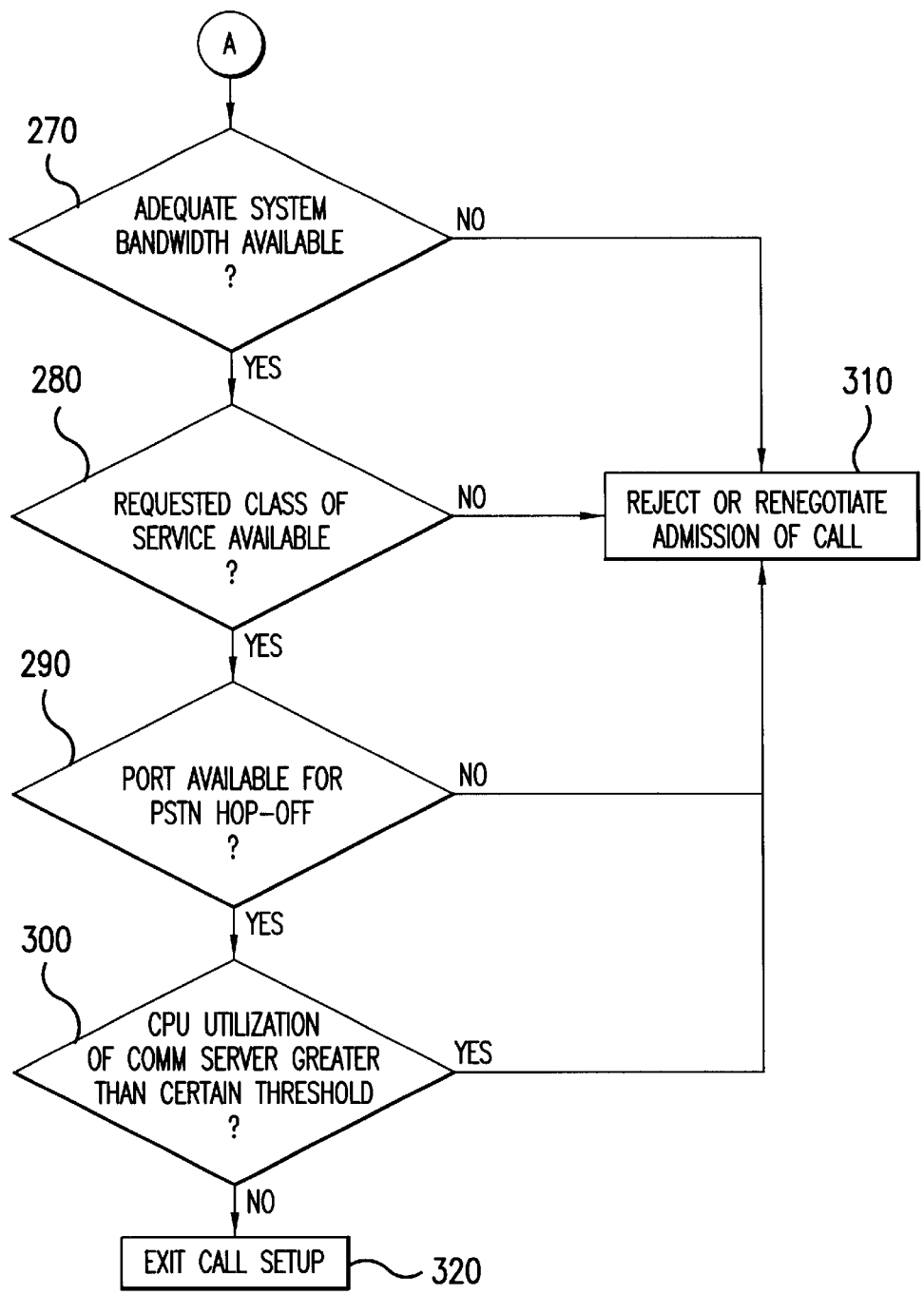

FIGS. 5A and 5B illustrate in flow chart form a method for setting up a call utilizing a quality of service agent in accordance with the present invention. In step 200, a user, such as for example one of the communication workstations 82–88 of FIG. 3, requests a call to be set up. In step 210, the QoS Agent 96 determines if the user entry is already in database 70. If the user entry is already stored in database 70, then in step 220 QoS Agent 96 retrieves the system parameters, as previously described with respect to FIG. 4, for the user from database 70. Since the information retrieved from database 70 can reduce the call setup time, in step 230 the QoS Agent 96 proceeds with "fast" signaling, i.e., call setup utilizing the information retrieved from the database.

If in step 210, the user entry is not stored in the database, in step 240, QoS Agent 96 starts a detailed call setup. In step 250, QoS Agent 96 gets the system and user information and in step 260 enters the information into database 70 for future use.

Figure 6:
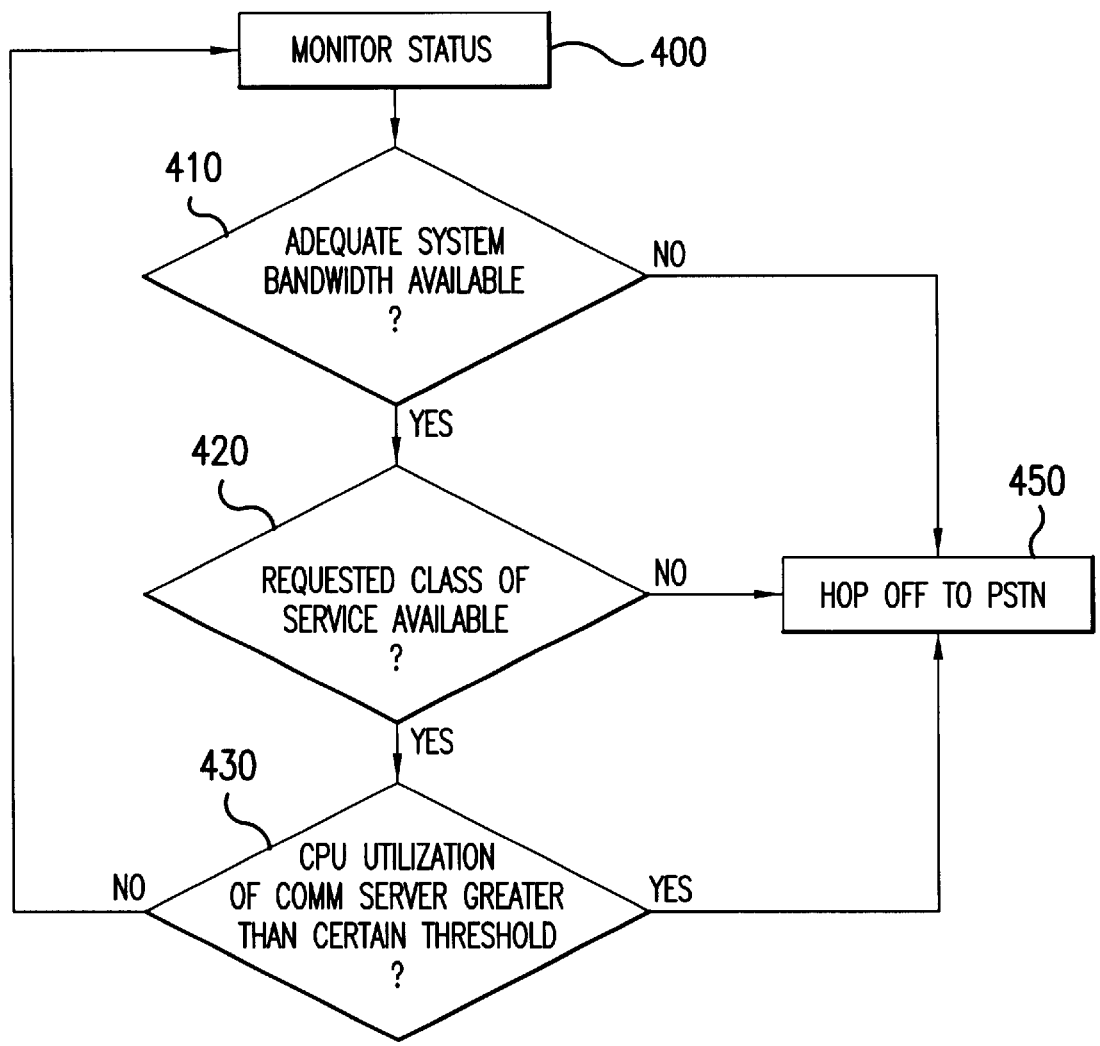
FIG. 6 illustrates in flow chart form a method for monitoring a call in progress utilizing a quality of service agent in accordance with the present invention.

Referring now to FIG. 5B, in step 270, the QoS Agent 96 next determines if there is adequate system bandwidth available to handle the call, based on the feedback 94 from the IP Network 90. If adequate system bandwidth is not available, in step 310 admission of the call to the system will be rejected or renegotiated. If adequate system bandwidth is available, in step 280 the QoS Agent 96 will determine if the requested class of service is available. If the requested class of service is not available, in step 310 admission of the call to the system will be rejected or renegotiated. If the requested class of service is available, in step 290 it will be determined if there is a port available for PSTN hop-off if necessary (FIG. 6). If there is no port available for PSTN hop-off, in step 310 admission of the call to the system will be rejected or renegotiated. If there is a port available for PSTN hop-of, in step 300 it will be determined if the utilization of the Central Processing Unit (CPU) of the communication server (not shown) handling the call setup is greater than a predetermined threshold level. If the utilization of the server's Central Processing Unit (CPU) is greater than a predetermined threshold level, in step 310 admission of the call to the system will be rejected or renegotiated. If the utilization of the server's Central Processing Unit (CPU) is not greater than a predetermined threshold level, i.e., the system can handle the call setup, in step 320 the call will be setup and the call setup process exited.

By utilizing the QoS Agent 96 of the present invention, if a requested call can not be currently handled through IP Network 90 with the minimum quality of service guaranteed by the Network Class of Service, admission of the call to the system will be rejected or renegotiated for a different class of service. In this manner, the system throughput can be increased and overall delays on the system will be reduced, as the amount of traffic the system is currently handling is reduced. Thus, the quality of service agent of the present invention optimizes both end-to-end application and network performance by providing network feedback at the application layer that can be used before or after call set-up, and provides personalized quality of service using differential class of services.

FIG. 6 illustrates in flow chart form a method for monitoring a call in progress to determine if the call should be transferred to a Public Switched Telephone Network (PSTN) utilizing a quality of service agent in accordance with the present invention. In step 400, the QoS Agent 96 is monitoring the status of the call and the IP Network 90 via feedback 94. In step 410, it is determined if there is adequate system bandwidth available to maintain the call. If adequate system bandwidth is not available, in step 450 the call is hopped off to the PSTN. If adequate system bandwidth is available, in step 420 the QoS Agent 96 will determine if the requested class of service is still available. If the requested class of service is not still available, in step 450 the call is hopped off to the PSTN. If the requested class of service remains available, in step 430 it is determined if the utilization of the Central Processing Unit (CPU) of the communication server handling the call is greater than a predetermined threshold level. If the utilization of the server's Central Processing Unit (CPU) is greater than a predetermined threshold level, in step 450 the call is hopped off to the PSTN. If the utilization of the server's Central Processing Unit (CPU) is not greater than a predetermined threshold level, i.e., the system can maintain the call without being over burdened, the method returns to step 400 to continue monitoring the call until it is completed or handled off to the PSTN.

Thus, by utilizing the QoS Agent 96 of the present invention, system throughput can be increased and overall delays on the system will be reduced, as the amount of traffic the system is currently handling is reduced. Accordingly, the quality of service agent of the present invention optimizes both end-to-end application and network performance by providing network feedback at the application layer that can be used before or after call set-up, and provides personalized quality of service using differential class of services.

Reference has been made to embodiments in describing the invention. However, additions, deletions, substitutions, or other modifications which would fall within the scope of the invention defined in the claims may be implemented by those skilled in the art and familiar with the disclosure of the invention without departing from the spirit or scope of the invention. Also, although the invention is described as implemented by a distributed software object or as a firmware object, it may be implemented in hardware, software, or any combination of the two. All are deemed equivalent with respect to the operation of the invention. Accordingly, the invention is not to be considered as limited by the foregoing description, but is only limited by the scope of the appended claims.

What is claimed as new and desired to be protected by Letters Patent of the United States is:

1. A method for negotiating a call between a first endpoint and a second endpoint of a communication system, said method comprising:

receiving a request to setup a call for a communication between said first endpoint and said second endpoint;

setting up said call based on information about at least said first endpoint;

determining if said communication system can admit said call at a predetermined quality of service level; and if said communication system can admit said call at said predetermined quality of service level, admitting said call to said communication system, and if said communication system cannot admit said call at said predetermined quality of service level, rejecting admission of said call to said communication system;

wherein said requested call setup is associated with a predetermined user class of service, and said step of determining further comprises:

converting said associated user class of service to a predefined network class of service.

2. The method according to claim 1, wherein said request is received from a user at said first endpoint, and said step of setting up said call further comprises:

setting up said call based on information about said user.

3. The method according to claim 2, wherein said step of setting up said call includes retrieving said information from a database.

4. The method according to claim 2, wherein said step of setting up said call further comprises:

receiving said information about said user from said user; and storing said information in a database.

5. The method according to claim 1, wherein the step of determining further comprises:

determining if said communication system can provide adequate bandwidth to handle said network class of service for said requested call.

6. The method according to claim 5, wherein said step of determining if said communication system can admit said requested call further comprises:

determining if said communication system can provide said predefined network class of service to handle said requested call.

7. The method according to claim 6, wherein said step of determining if said communication system can admit said requested call further comprises:

determining if a port is available to transfer said requested call to a different communication system.

8. The method according to claim 7, wherein said different communication system includes a PSTN.

9. The method according to claim 7, wherein said step of determining if said communication system can admit said requested call further comprises:

determining if said requested call will cause utilization of a communication server in said communication system to exceed a predefined level.

10. The method according to claim 1, wherein said step of rejecting admission of said requested call further comprises:

renegotiating admission of said requested call to said communication system.

11. The method according to claim 1, wherein if said communication system admits said requested call, said method further comprises:

monitoring said admitted call;

determining if said communication system can maintain said admitted call;

continuing said call if said communication system can maintain said call; and if said communication system cannot maintain said call, handing off said call to another communication system.

12. The method according to claim 11, wherein said step of handing off said call includes handing off said call to a PSTN.

13. The method according to claim 11, wherein said step of determining if said communication system can maintain said admitted call further comprises:

determining if said communication system can provide adequate bandwidth to maintain said network class of service for said requested call.

14. The method according to claim 13, wherein said step of determining if said communication system can maintain said admitted call further comprises:

determining if said communication system can maintain said predefined network class of service to handle said requested call.

15. The method according to claim 14, wherein said step of determining if said communication system can maintain said admitted call further comprises:

determining if maintaining said requested call will cause utilization of a communication server in said communication system to exceed a predefined level.

16. The method according to claim 1, wherein said communication system includes an IP network.

17. A method for maintaining a communication between a first end point and a second endpoint in a communication system, said method comprising:

monitoring said communication;

determining if said communication system can maintain said communication;

continuing said communication if said communication system can maintain said communication; and if said communication system cannot maintain said communication, handing off said communication to another communication system;

wherein said communication is associated with a predetermined user class of service, and said step of determining if said communication system can maintain said communication further comprises:

converting said associated user class of service to a predefined network class of service.

18. The method according to claim 17, wherein said step of handing off said communication includes handing off said communication to a PSTN.

19. The method according to claim 17, wherein the step of determining if said communication system can maintain said communication further comprises:

determining if said communication system can provide adequate bandwidth to maintain said network class of service for said communication.

20. The method according to claim 19, wherein said step of determining if said communication system can maintain said communication further comprises:

determining if said communication system can maintain said predefined network class of service to handle said communication.

21. The method according to claim 20, wherein said step of determining if said communication system can maintain said communication further comprises:

determining if maintaining said communication will cause utilization of a communication server in said communication system to exceed a predefined level.

22. The method according to claim 17, wherein said communication system includes an IP network.

23. A communication system comprising:
a communication network;
a plurality of endpoints, each of said plurality of endpoints adapted to communicate to another of said plurality of endpoints via said communication network;
a control device connected between said plurality of endpoints and said communication network, said control device adapted to establish and maintain a call from a first of said plurality of endpoints to a second of said plurality of endpoints, said control device further adapted to monitor a status of said communication network during said call; and
a database connected to said control device, said database storing information about at least said first endpoint,
wherein said control device is adapted to negotiate a call by determining if a predetermined quality of service level for said call based on said information about at least said first endpoint and said status of said communication network can be provided, said control device further adapted to reject admission of said call to said communication network if said communication system cannot provide said predetermined quality of service level for said call; and
wherein said call is associated with a predetermined user class of service, and said control device further comprises:
a translator to convert said user class of service to a predetermined network class of service.

24. The communication system according to claim 23, wherein said control device is further adapted to renegotiate admission of said call from said first of said plurality of endpoints to said second of said plurality of endpoints to said communication network if said communication system cannot provide said predetermined quality of service level for said call.

25. The communication system according to claim 24, wherein said communication network is an IP network.

26. The communication system according to claim 23, wherein said control device further comprises:
a call coordinator adapted to establish said call by negotiating with said communication network to implement said predetermined quality of service level.

27. The communication system according to claim 26, wherein said control device further comprises:
a management coordinator adapted to define a path for said call through said communication network.

28. The communication system according to claim 23, wherein said control device is further adapted to determine if said communication system can provide said predetermined quality of service level for said call by determining if said communication system can provide adequate bandwidth to handle said network class of service for said call.

29. The communication system according to claim 28, wherein said control device is further adapted to determine if said communication system can provide said predetermined quality of service level for said call by determining if said communication system can provide said predefined network class of service to handle said call.

30. The communication system according to claim 29, wherein said control device is further adapted to determine if said communication system can provide said predetermined quality of service level for said call by determining if a port is available to transfer said call to a different communication network.

31. The communication system according to claim 30, wherein said different communication network is a PSTN.

32. The communication system according to claim 30, wherein said control device is further adapted to determine if said communication system can provide said predetermined quality of service level for said call by determining if said call will cause utilization of a communication server in said communication network to exceed a predefined level.

33. The communication system according to claim 32, wherein said control device is further adapted to determine if said communication system can maintain said predetermined quality of service level for said call.

34. The communication system according to claim 33, wherein if said communication system cannot maintain said predetermined quality of service level for said call, said control device is further adapted to hand off said call to said different communication network through said port.

35. The communication system according to claim 34, wherein said control device is further adapted to determine if said communication system can maintain said predetermined quality of service level for said call by determining if said communication system can maintain adequate bandwidth to handle said network class of service for said call.

36. The communication system according to claim 35, wherein said control device is further adapted to determine if said communication system can maintain said predetermined quality of service level for said call by determining if said communication system can maintain said predefined network class of service to handle said call.

37. The communication system according to claim 36, wherein said control device is further adapted to determine if said communication system can maintain said predetermined quality of service level for said call by determining if said call is causing utilization of a communication server in said communication network to exceed a predefined level.

38. The communication system according to claim 23, wherein said plurality of endpoints includes a telephone.

39. The communication system according to claim 23, wherein said plurality of endpoints includes a personal computer.

40. The communication system according to claim 23, wherein said plurality of endpoints includes a personal data assistant.

41. A multi-layered communication network comprising:
a first layer to control implementation of a physical circuit between one or more endpoints in said communication network and to control transport of data through said physical circuit;
a second layer to control coordination of a call between said one or more endpoints in said communication network; and
a third layer to provide a quality of service agent to control a quality of service of said call,
wherein said quality of service agent is adapted to negotiate a call by determining if said communication network can provide a predetermined quality of service level for said call based on information about said one or more endpoints and a status of said communication network, and if said communication network can provide said predetermined quality of service level for said call, admit said call to said communication network; and
wherein said call is associated with a predetermined user class of service, and said quality of service agent is further adapted to convert said user class of service to a predetermined network class of service.

42. The communication network according to claim 41, wherein if said communication network cannot provide at said predetermined quality of service level for said call, said quality of service agent is further adapted to reject admission of said call to said communication network.

43. The communication network according to claim 42, wherein said plurality of service agent is further adapted to renegotiate admission of said call to said communication network.

44. The communication network according to claim 41, further comprising:
   a database to store information about said one or more endpoints in said communication network.

45. The communication network according to claim 41, wherein if said call is admitted to said communication network, said quality of service agent is further adapted to determine if said communication network can maintain said predetermined quality of service level for said call.

46. The communication network according to claim 45, wherein if said communication network cannot maintain said predetermined quality of service level for said call, said quality of service agent is further adapted to hand off said call to a different communication network.

47. The communication network according to claim 46, wherein said different communication network is a PSTN.

48. The communication network according to claim 41, wherein said communication network is an IP network.

49. A communication apparatus comprising:
   a control device connected to a plurality of endpoints and a communication network, said control device adapted to establish and maintain a call from a first of said plurality of endpoints to a second of said plurality of endpoints through said communication network, said control device further adapted to monitor a status of said communication network during said call; and
   a database connected to said control device, said database storing information about at least said first endpoint,
   wherein said control device is adapted to negotiate a call by determining if a predetermined quality of service level for said call based on said information about at least said first endpoint and said status of said communication network can be provided, said control device further adapted to reject admission of said call to said communication network if said control device cannot provide said predetermined quality of service level for said call; and
   wherein said call is associated with a predetermined user class of service, and said control device further comprises:
      a translator to convert said user class of service to a predetermined network class of service.

50. The apparatus according to claim 49, wherein said control device is further adapted to renegotiate admission of said call from said first of said plurality of endpoints to said second of said plurality of endpoints to said communication network if said communication network cannot provide said predetermined quality of service level for said call.

51. The apparatus according to claim 49, wherein said control device further comprises:
   a call coordinator adapted to establish said call by negotiating with said communication network to implement said predetermined quality of service level.

52. The apparatus according to claim 51, wherein said control device further comprises:
   a management coordinator adapted to define a path for said call through said communication network.

53. The apparatus according to claim 52, wherein said control device is further adapted to determine if said communication network can provide said predetermined quality of service level for said call by determining if said communication network can provide adequate bandwidth to handle said network class of service for said call.

54. The apparatus according to claim 53, wherein said control device is further adapted to determine if said communication network can provide said predetermined quality of service level for said call by determining if said communication network can provide said predefined network class of service to handle said call.

55. The apparatus according to claim 54, wherein said control device is further adapted to determine if said communication network can provide said predetermined quality of service level for said call by determining if a port is available to transfer said call to a different communication network.

56. The apparatus according to claim 55, wherein said different communication network is a PSTN.

57. The apparatus according to claim 55, wherein said control device is further adapted to determine if said communication network can provide said predetermined quality of service level for said call by determining if said call will cause utilization of a communication server in said communication network to exceed a predefined level.

58. The apparatus according to claim 57, wherein said control device is further adapted to determine if said communication network can maintain said predetermined quality of service level for said call.

59. The apparatus according to claim 58, wherein if said communication network cannot maintain said predetermined quality of service level for said call, said control device is further adapted to hand off said call to said different communication network through said port.

60. The apparatus according to claim 59, wherein said control device is further adapted to determine if said communication network can maintain said predetermined quality of service level for said call by determined if said communication network can maintain adequate bandwidth to handle said network class of service for said call.

61. The apparatus according to claim 60, wherein said control device is further adapted to determine if said communication network can maintain said predetermined quality of service level for said call by determining if said communication network can maintain said predefined network class of service to handle said call.

62. The apparatus according to claim 61, wherein said control device is further adapted to determine if said communication network can maintain said predetermined quality of service level for said call by determining if said call is causing utilization of a communication server in said communication network to exceed a predefined level.

63. The apparatus according to claim 49, wherein said plurality of endpoints includes a telephone.

64. The apparatus according to claim 49, wherein said plurality of endpoints includes a personal computer.

65. The apparatus according to claim 49, wherein said plurality of endpoints includes a personal data assistant.

66. A quality of service agent for a communication network to control a quality of service of a call between two or more endpoints in said communication network, said quality of service agent being adapted to negotiate a call by determining if said communication network can provide a predetermined quality of service level for said call based on information about at least one endpoint of said two or more endpoints and a status of said communication network, and if said communication network can provide said predetermined quality of service level for said call, admit said call to said communication network, wherein said call is associated with a predetermined user class of service, and said quality of service agent is further adapted to convert said user class of service to a predetermined network class of service.

67. The quality of service agent according to claim 66, wherein if said communication network cannot provide said predetermined quality of service level for said call, said quality of service agent is further adapted to reject admission of said call to said communication network.

68. The quality of service agent according to claim 67, wherein said quality of service agent is further adapted to renegotiate admission of said call to said communication network.

69. The quality of service agent according to claim 66, further comprising:

a database to store information about said at least one endpoint of said two or more endpoints in said communication network.

70. The quality of service agent according to claim 66, wherein if said call is admitted to said communication network, said quality of service agent is further adapted to determine if said communication network can maintain said predetermined quality of service level for said call.

71. The quality of service agent according to claim 70, wherein if said communication network cannot maintain said predetermined quality of service level for said call, said quality of service agent is further adapted to hand off said call to a different communication network.

* * * * *